United States Patent Office 2,902,260
Patented Sept. 1, 1959

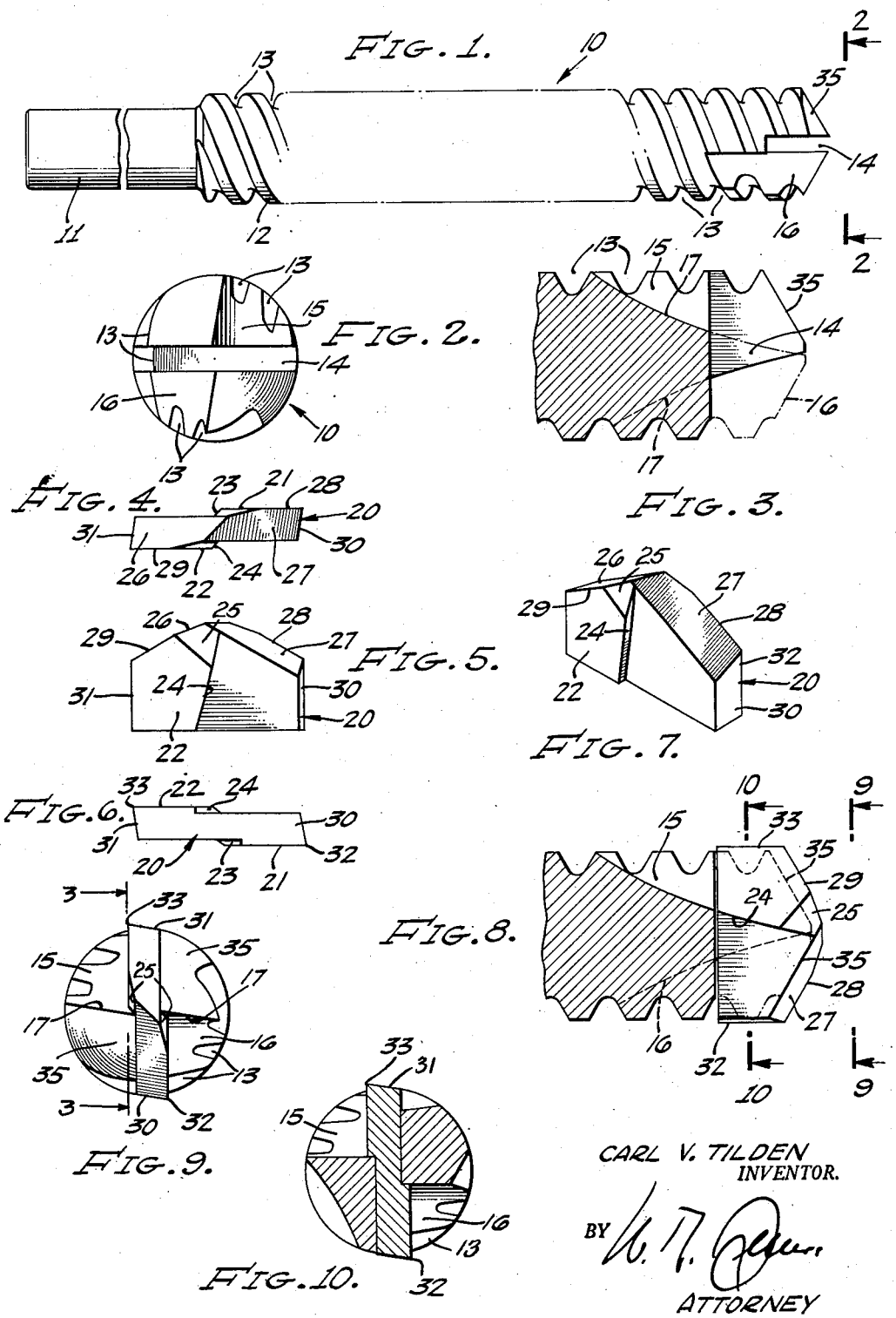

2,902,260
DRILL BIT
Carl V. Tilden, Capistrano Beach, Calif.
Application July 16, 1957, Serial No. 672,231
2 Claims. (Cl. 255—69)

This invention relates to drill bits and more particularly to an improved bit for drilling rock, concrete and the like hard, brittle materials presenting special drilling problems.

The present invention is particularly useful in drilling small diameter holes of a size not usually drilled with a core-type drill and where it is desirable to remove the entire cross-section in the form of chips and small particles. The cutting teeth of the drill tool must be capable of resisting wear, fracture, the abrasive action of the chips and of the material being drilled and must be capable of retaining these characteristics in the presence of heat generated in use. It has been the practice to make the drill body of high-strength material such as steel, and to mount abrasion-resistant cutting elements at the cutting end. The present invention is concerned with a drill of this type having an improved cutting element anchored in place in the body in an effective manner, the drill body preferably being made of relatively inexpensive steel and the cutting element of tungsten carbide or its equivalent. Particularly featured is a cutting element having offset projections on its opposite faces shaped for edgewise interlocking assembly into a transverse seating slot in the tip of the drill body. The interengaging walls of the element and slot are such that the cutter is accurately and rigidly locked against movement in all directions except the reverse of that required for assembly into the slot. In consequence, it is a simple matter to secure the tip in place without need for precision jigs by brazing or by welding. Other features of the invention include direct high-strength backing of all parts of the cutter and the provision of large chip-receiving channels on the leading or cutting edges of the drill, these channels feeding into helical grooves or the like for conveying material from the cutting tip.

Accordingly, it is a primary object of this invention to provide an improved drill for use in boring rock, concrete and other hard materials.

Another object of the invention is the provision of a drill for use in boring hard materials featuring a main body made from inexpensive material and a cutting tip characterized by its ability to withstand abrasion and to maintain a sharp cutting edge while operating under pressure and in the presence of heat.

Another object of the invention is the provision of a drill for hard materials having a solid body provided at its working end with a transverse slot having its opposite end side faces merging with chip-receiving channels, and wherein the slot seats a plate-like cutting element of wear-resistant material having projections shaped to interlock with said chip-receiving channels.

Another object of the invention is the provision of a specially contoured cutting tip having oppositely beveled cutting edges on its transverse ends and oppositely inclined cutting edges extending longitudinally along its opposite ends.

These and other more detailed objects will become apparent from the foregoing detailed description taken in connection with the accompanying drawing and the annexed claims.

Again referring to the drawing showing an illustrative embodiment of the invention wherein:

Figure 1 is a longitudinal side view of the main body of the drill bit;

Figure 2 is an enlarged end view taken along line 2—2 of Figure 1;

Figure 3 is an enlarged cross-sectional view taken on line 3—3 of Figure 9;

Figure 4 is a view looking at the transverse cutting end of the cutting element showing the lateral projections which interlock with the slot of the drill body;

Figure 5 is a side view of the cutting element;

Figure 6 is a bottom view of the inner transverse edge of the cutting element;

Figure 7 is an isometric view of the cutting element;

Figure 8 is a view similar to Figure 3 but showing the cutting element in assembled position in the slot of the drill body;

Figure 9 is an end view of the assembled drill taken along line 9—9 of Figure 8; and Figure 10 is a transverse sectional view taken on line 10—10 of Figure 8.

Referring to Figure 1, there is shown the main body of a drill bit designated generally 10 formed at one end with a shank end 11 adapted to be releasably clamped in the chucking device of a suitable driving unit such as a motor-driven drill. Extending from shank 11 is a helically grooved section 12 having any suitable length and preferably substantially in excess of the deepest hole to be drilled thereby. The helical grooves 13 are of sufficient width and depth as to be capable of conveying chips and particles dislodged by the cutting element and operate in known manner to advance the chips and particles toward the shank end as the drill is rotated.

The tip or working end of the body is provided with a narrow transverse slot 14 having its diagonally opposed side faces cut away longitudinally of the main body to form a pair of chip-receiving channels 15 and 16 of the general shape illustrated in Figures 1–3, these channels being of sufficient length to intersect several convolutions of the helical grooves 13. From Figure 3 it will be observed that the back walls 17, 17 of chip channels 15 and 16 converge toward the axis of the drill along a generally arcuate path and terminate at the tip end of the main body at a point lying in the longitudinal axis of the drill.

Referring to Figures 4 to 7, it will be seen that the cutting element designated generally 20 has the appearance of a plate-like prism. Viewed from its bottom transverse edge shown in Figure 6, it will be seen that the cutter may be described as a plate having oppositely directed offsets 21, 22 on its opposite faces, the adjacent inner edges 23, 24 of these offsets having curved contours which conform to the converging sides 17, 17 of chip-receiving channels 15 and 16. The upper corners of offsets 21, 22 are preferably cut off along inclined planes as indicated at 25. When the cutter element is assembled in slot 14, its edges 23 and 24 seat firmly against and interlock with the faces 17, 17. It will also be understood that the center portion of the cutter has a thick snugly fitting slot 14 at the end of the drill body. The outer transverse edge of the cutter is provided with converging faces 26, 27 inclined in opposite directions to provide cutting or leading edges 28 and 29. Likewise the lateral longitudinal ends of the cutter are provided with parallel faces 30 and 31 inclined slightly to the side faces similarly to the faces 26 and 27 thereby providing longitudinally extending cutting edges 32 and 33. As is clearly shown in Figures 8, 9 and 10, these cutting edges 32 and 33 project slightly beyond the cylindrical body of the drill proper whereby they are effective to cut a hole slightly larger than the diameter of the drill body.

Figures 8 and 9 best show that the conical surfaces 35 at the advanced end of the drill body lie flush with the trailing edges of faces 26 and 27 of the cutter. Likewise, the trailing edges of the longitudinal end faces 30, 31 lie flush with the adjacent side walls of the drill body. Accordingly, all portions of the cutting element are directly backed by the steel main body of the drill with the result that when the drill is in operation the exposed portions of the cutter are in compression. This is important in connection with cutter elements formed from materials having low strengths in shear and tension.

While cutter element 20 may be made in various ways, a preferred method is to cast it from powdered metal sintered or bonded together with high-strength bonding agents on molds substantially identical in size and contour to the finished cutter element whereby a finish grinding operation is all that is required to complete its manufacture. Tungsten carbide is a particularly suitable material.

The assembly of the two drill components will be readily apparent from the foregoing description. Thus it is only necessary to insert the cutter 20 longitudinally into receiving slot 14 until edges 23 and 24 seat firmly against faces 17, 17 of chip channels 15 and 16. When so positioned, it is impossible to move the element in any direction except in a direction reverse to the assembly operation. To prevent accidental loss of the cutter from slot 14, it may be brazed, welded or otherwise secured in place. After the leading or cutting edges have become dull or worn following long use, the old cutter may be removed by applying a torch to the brazing after which the worn cutter is replaced with a new one.

In use, the drill is inserted and rotated in a direction to advance the leading or cutting edges of the cutter element into the material to be drilled. Chips and fine cuttings pass into channels 15 and 16 and find their way into the helical conveying grooves 13 along which they are conveyed to points of discharge at the shank end of the drill body.

While the particular drill bit herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A drill bit for drilling rock and the like hard brittle materials, said bit having an elongated unitary generally cylindrical metal body provided with a mounting shank at one end of reduced diameter, the remainder and larger diameter portion of said drill having a plurality of low-pitch helical chip-conveying channels of arcuate cross-section formed therein, said channels being freely open at both ends for the reception and discharge of chips, the cutting end of said bit opposite the shank end thereof having a narrow transverse slot extending diametrically thereacross and parallel to the longitudinal axis of the drill, one diametrically opposed pair of quandrants of said cutting end being cut away lengthwise of said bit for a distance traversing said helical chip channels a plurality of times, said quadrants having one face lying generally parallel to one another and flush with a different side wall of said slot and parallel to the longitudinal axis of the bit, and the other wall of each quadrant being arcuate and adapted to feed chips away from the bit tip and crosswise of said helical chip conveying channels, the other pair of quandrants of said cutting tip between said first mentioned quadrants being solid and integral with the drill body, and a cutting tip plate of abrasion resistant metal secured in said diametric slot, the diametrically opposed side faces of said plate being offset with their adjacent ends curved correspondingly to the curvature of said cut-away quadrants and positioned to seat snugly against the associated one thereof and cooperating therewith to lock said plate against movement crosswise of the drill bit, said plate having cutting edges along its diametrically opposed lateral ends projecting slightly beyond the sides of the drill body and lying parallel to the longitudinal axis thereof, and the transverse exterior edges of said plate on the opposite end halves thereof being the leading or cutting edges of the plate and projecting slightly further than the opposed or trailing transverse edges.

2. A drill bit for drilling rock and the like hard brittle materials, said bit having an elongated unitary generally cylindrical metal body provided with a mounting shank at one end of reduced diameter, the remaining larger diameter portion of said drill having a plurality of low-pitch helical chip-conveying channels formed therein, said channels being freely open at both ends for the reception and discharge of chips, the cutting end of said bit opposite the shank end thereof having a narrow transverse slot extending diametrically thereacross and parallel to the longitudinal axis of the drill, one diametrically opposed pair of quadrants of said cutting end being cut away lengthwise of said bit for a distance traversing said helical chip channels a plurality of times, said quadrants having one face lying generally parallel to one another and flush with a different side wall of said slot and parallel to the longitudinal axis of the bit, and the other wall of each quadrant being arcuate and adapted to feed chips away from the bit tip and crosswise of said helical chip-conveying channels, the other pair of quadrants of said cutting tip being solid and integral with the drill body, and a cutting tip plate of abrasion resistant metal secured in said diametric slot, said plate having its outer transverse edge cut off along planes inclined in opposite directions from one another and rearwardly of the drill tip from a point on the longitudinal axis of the bit to provide diametrically opposed transverse cutting edges higher than the associated opposed trailing transverse edges, the opposite ends of said cutting plate having diametrically opposed leading edges parallel to and positioned slightly beyond the opposite sides of the drill body, and the diametrically opposed side faces on the end halves of said plate being offset away from one another with their adjacent end edges shaped to seat firmly against a side wall of said first-mentioned pair of quadrants and being cooperable therewith to hold said plate seated centrally within said diametric slot.

References Cited in the file of this patent

UNITED STATES PATENTS

| | | |
|---|---|---|
| 1,847,302 | Emmons | Mar. 1, 1932 |
| 2,635,856 | Scheffer | Apr. 21, 1953 |

FOREIGN PATENTS

| | | |
|---|---|---|
| 325,383 | Great Britain | Feb. 20, 1930 |
| 375,596 | Great Britain | June 30, 1932 |
| 584,050 | Germany | Aug. 31, 1933 |